(12) United States Patent  (10) Patent No.: US 7,845,796 B2
Suzuki  (45) Date of Patent:  Dec. 7, 2010

(54) SPECTACLE LENS

(75) Inventor: Kenzaburo Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/508,555

(22) Filed: Jul. 23, 2009

(65) Prior Publication Data

US 2010/0045929 A1  Feb. 25, 2010

Related U.S. Application Data

(63) Continuation of application No. PCT/JP2008/000074, filed on Jan. 24, 2008.

(30) Foreign Application Priority Data

Jan. 25, 2007  (JP)  ............................ P2007-015099

(51) Int. Cl.
*G02C 7/02*  (2006.01)
(52) U.S. Cl. ...................... 351/159; 351/172
(58) Field of Classification Search ................. 351/159, 351/163–176
See application file for complete search history.

(56) References Cited

U.S. PATENT DOCUMENTS

| | | | |
|---|---|---|---|
| 5,847,877 A | 12/1998 | Imamura et al. | |
| 6,008,942 A | 12/1999 | Ogusu et al. | |
| 6,157,488 A | 12/2000 | Ishii | |
| 6,781,756 B1 | 8/2004 | Ishii | |
| 2004/0263982 A1 | 12/2004 | Ishii | |
| 2008/0278681 A1* | 11/2008 | Blum et al. | ................. 351/169 |

FOREIGN PATENT DOCUMENTS

| | | | |
|---|---|---|---|
| JP | 9-127321 A | 5/1997 | |
| JP | 9-127322 A | 5/1997 | |
| JP | 2000-284238 A | 10/2000 | |
| JP | 2004-013081 A | 1/2004 | |

OTHER PUBLICATIONS

Introduction to Diffractive Optical Elements, revised and enlarged edition, pp. 25-38, pp. 163-175, The Optronics Co., Ltd., Dec. 8, 2006.

* cited by examiner

*Primary Examiner*—Darryl J Collins
(74) *Attorney, Agent, or Firm*—Miles & Stockbridge P.C.

(57) ABSTRACT

A spectacle lens includes a multi-contact diffractive optical element formed on at least one surface of a overall lens system that is arranged from an object to a pupil, in which an apparent Abbe number $V_d$ when the overall lens system including the multi-contact diffractive optical element is regarded as a single lens satisfies $V_d > 60$ . . . (1).

13 Claims, 10 Drawing Sheets

SPECTACLE LENS

CROSS-REFERENCE TO RELATED APPLICATION

This is a Continuation Application of International Application No. PCT/JP2008/000074, filed Jan. 24, 2008, which claims priority to Japanese Patent Application No. 2007-015099, filed Jan. 25, 2007. The contents of the aforementioned applications are incorporated herein by reference.

BACKGROUND

1. Field of the Invention

The present invention relates to a spectacle lens.

2. Description of Related Art

For a spectacle lens (an eye-glass), a refractive optical element such as a piece of glass or a plastic resin is used. In general, a spectacle lens is made of a single lens for the sake of reduction in size and weight, and is not subjected to achromatism (correction of chromatic aberration). Patent Document 1 proposes a combination of diffractive optical elements for correcting the chromatic aberration (especially, chromatic aberration of magnification) of a spectacle lens while maintaining its small size and light weight.

[Patent Document 1]
Japanese Unexamined Patent Publication, First Publication No. 2000-284238

[Patent Document 2]
U.S. Pat. No. 6,008,942

[Non-Patent Document 1]
Introduction to Diffractive Optical Elements, revised and enlarged edition, pp. 25-38, pp. 163-175, The Optronics Co., Ltd., Dec. 8, 2006

[Non-Patent Document 2]
OPTICAL AND ELECTROOPTICAL ENGINEERING CONTACT, September Issue, JAPAN OPTOMECHATRONICS ASSOCIATION, September, 2004

SUMMARY

However, conventional diffractive optical elements are designed to properly act on light at a specified wavelength. Therefore, in a spectacle lens, a multitude of flares occur with light at wavelengths other than the specified wavelength, resulting in reduction of image quality. In addition, some types of diffractive optical elements have a high manufacturing cost, and hence may not be suitable for mass-production-oriented spectacle lenses.

It is an object of some aspects of the present invention to provide a spectacle lens with high performance and excellent in mass producibility.

One aspect of the present invention provides a spectacle lens including a multi-contact diffractive optical element formed on at least one surface of a overall lens system (whole lens system) that is arranged between an object and a pupil, in which an apparent Abbe number $V_d$ when the overall lens system including the multi-contact diffractive optical element is regarded as a single lens satisfies $V_d > 60$ ... (1).

It is desirable that a refractive index difference $\Delta N_d$ with respect to a d-line between two layers of the multi-contact diffractive optical element in close contact with each other satisfy $0.005 < \Delta N_d < 0.45$ ... (2) at least in a vicinity of an interface between the two.

It is desirable that one of the two layers of the multi-contact diffractive optical element in close contact with each other be made of a material with a high refractive index and a low dispersion and that the other of the two layer be made of a material with a low refractive index and a high dispersion, and that a refractive index difference $\Delta N_F$ with respect to an F-line between the two layers and a refractive index difference $\Delta N_C$ with respect to a C-line therebetween satisfy $\Delta N_F < \Delta N_C$ ... (3).

It is desirable that a diffraction efficiency $E_d$ with respect to a d-line of the multi-contact diffractive optical element, a diffraction efficiency $E_g$ with respect to a g-line, and a diffraction efficiency $E_C$ with respect to a C-line satisfy $(E_g + E_C)/2 > 0.9 \times E_d$ ... (4).

It is desirable that a difference $\Delta(N_F - N_C)$ in a main dispersion $(N_F - N_C)$ between the two layers of the multi-contact diffractive optical element in close contact with each other, and a refractive index difference $\Delta N_d$ with respect to a d-line therebetween satisfy $-10.0 < \Delta N_d / \Delta(N_F - N_C) < -2.0$ ... (5).

It is desirable that an axial thickness "d", which is a smaller axial thicknesses of the two layers of the multi-contact diffractive optical element in close contact with each other, and a grating height "h" of a diffractive optical surface possessed by the multi-contact diffractive optical element satisfy $0.05 < h/d < 2.0$ ... (6).

It is desirable that a rising surface of each grating of the diffractive optical surface possessed by the multi-contact diffractive optical element be provided with an inclination along a ray going toward the pupil.

It is desirable that, if the overall lens system exclusive of the multi-contact diffractive optical element has a positive optical power, the multi-contact diffractive optical element have a positive optical power.

It is desirable that, if the overall lens system exclusive of the multi-contact diffractive optical element has a negative optical power, the multi-contact diffractive optical element have a negative optical power.

It is desirable that, if the overall lens system is a meniscus lens convex toward an object side, a formation target of the multi-contact diffractive optical element be a surface on a pupil side or a surface on the object side of the meniscus lens.

If the overall lens system is a cemented meniscus lens convex toward an object side, a formation target of the multi-contact diffractive optical element may be a cementing surface of the cemented meniscus lens.

Another aspect of the present invention provides a spectacle lens including a multi-contact diffractive optical element formed on a concave surface of a meniscus lens with a negative optical power, in which the multi-contact diffractive optical element has a negative optical power, and, of two layers of the multi-contact diffractive optical element in close contact with each other, a layer on the concave surface side of the meniscus lens has a refractive index higher than that of the other layer.

It is desirable that a rising surface of each grating of the diffractive optical surface possessed by the multi-contact diffractive optical element be provided with an inclination along a ray going toward a pupil, and that a maximum value $\Delta_{mx}$ of a length of the rising surface in a direction perpendicular to an optical axis satisfy $2\,\mu m < \Delta_{mx} < 30\,\mu m$ ... (7).

According to some aspects of the present invention, a spectacle lens with high performance and excellent in mass producibility is implemented.

DESCRIPTION OF EMBODIMENTS

Figure 1:
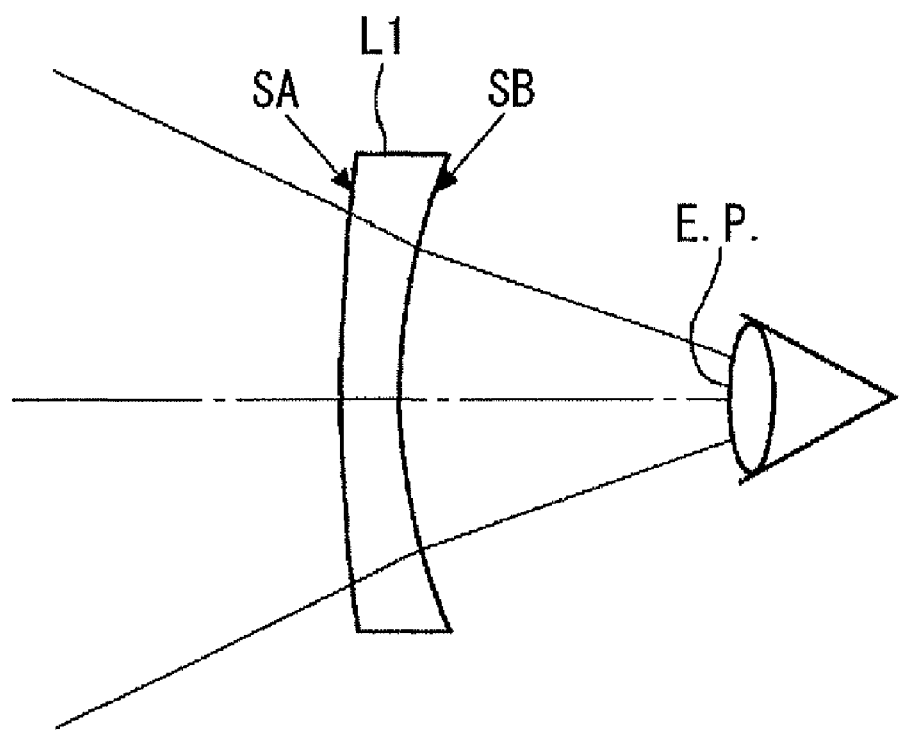
FIG. 1 is a schematic diagram showing a spectacle lens of an embodiment.

First, a diffractive optical element will be briefly described.

A surface of a diffractive optical element where a diffraction phenomenon occurs (hereinafter, referred to as diffractive optical surface) has a negative dispersion value if the surface has a positive optical power. This enables a favorable chromatic aberration correction which only special glass has been able to achieve, and is effective especially in correcting chromatic aberration of magnification. However, in conventional diffractive optical elements, a multitude of flares occur at wavelengths off the design wavelength. Therefore, the application of the conventional diffractive optical elements has been limited to a quasi-monochromatic light source or a monochromatic light source such as a laser light source.

On the other hand, a multilayered diffractive optical element in which a plurality of diffractive optical surfaces are stacked has a high diffractive efficiency over a wide band, and hence has an advantage of suppressing flares. For example, a multilayered diffractive optical element with two layers (dual type) is made of: a first diffractive optical constituent; and a second diffractive optical constituent having a different refractive index and dispersion from the first diffractive optical constituent, the first diffractive optical constituent being stacked on top or bottom of the second first diffractive optical constituent, in which a diffractive optical surface with a jagged shape (blazed type) is formed in the opposing surfaces thereof. If a grating height $d_1$ of the diffractive optical surface of the first diffractive optical constituent is determined so as to satisfy an achromatism condition for two specified wavelengths, and also a grating height $d_2$ of the diffractive optical surface of the second diffractive optical constituent is determined to be another predetermined value, then the diffraction efficiency of the multilayered diffractive optical element for the two wavelengths is 1. Therefore, it is possible to obtain a high diffraction efficiency for other wavelengths. Note that the phrase "diffraction efficiency" here is a ratio between an intensity $I_0$ of light incident on the diffractive optical surface and an intensity $I_1$ of first order diffracted light produced on the diffractive optical surface, the ratio $\eta$ being expressed by $\eta = I_1/I_0$.

Especially, if the multilayered diffractive optical element satisfies a predetermined condition (see formula (5) on p. 167 of Non-Patent Document 1), it becomes possible to coincide $d_1$ with $d_2$. This implements a multi-contact diffractive optical element (dual-contact diffractive optical element) with its two diffractive optical surfaces in close contact with each other. Compared with a separation-type multilayered diffractive optical element, a multi-contact diffractive optical element has advantages such as a low error sensitivity (tolerance grade) to the grating height of the diffractive optical surface and a low error sensitivity (tolerance grade) to a surface roughness of the diffractive optical surface, and hence has an advantage in mass production. Details of such a multi-contact diffractive optical element is described also on pp. 163-175 of Non-Patent Document 1 and in Non-Patent Document 2, and the like.

Next, a description of a spectacle lens of the present embodiment will begin.

FIG. 1 is a schematic diagram of a spectacle lens (an eye-glass) of the present embodiment. In FIG. 1, reference letters E.P. denote the pupil of an eye (eye-point). As shown in FIG. 1, the spectacle lens of the present embodiment is based on a meniscus lens L1 in which a curved surface of a convex is arranged on the object side, similarly to a conventional spectacle lens. The reason for adopting a meniscus lens as a spectacle lens is to satisfy a solution called "Tscherning's ellipse" in order to reduce astigmatism which is likely to be comparatively conspicuous. As a result, whether the optical power of the spectacle lens is set to be positive or negative, the spectacle lens becomes a meniscus lens.

However, in the spectacle lens of the present embodiment, a multi-contact diffractive optical element is formed on at least either one of a surface SA (convex surface) on the object side and a surface SB (concave surface) on the pupil side of the meniscus lens L1. In design, the multi-contact diffractive optical element may be formed either on the surface SA or SB. However, in use, it is desirable that the multi-contact diffractive optical element be formed on the surface SB. This is because, on the surface SB, the multi-contact diffractive optical element is less likely to be damaged when in use.

If the observing eye is farsighted, the optical power of the meniscus lens L1 as a single unit is set to be positive. In this case, the optical power of the multi-contact diffractive optical element is also set to be positive.

In this case, the dispersion of the meniscus lens as a single unit is positive, and the dispersion of the multi-contact diffractive optical element is negative. Therefore, the dispersions have opposite signs. Consequently, with the adjustment of balance between the optical power allocated to the meniscus lens L1 as a single unit and the optical power allocated to the multi-contact optical element, it is possible to correct the chromatic aberration in the spectacle overall lens system (whole lens system).

On the other hand, if the observing eye is shortsighted, the optical power of the meniscus lens L1 as a single unit is set to be negative. In this case, the optical power of the multi-contact diffractive optical element is also set to be negative.

In this case, the dispersion of the meniscus lens L1 as a single unit is negative, and the dispersion of the multi-contact diffractive optical element is positive. Therefore, the dispersions have opposite signs. Consequently, with the adjustment of balance between the optical power allocated to the meniscus lens L1 as a single unit and the optical power allocated to the multi-contact optical element, it is possible to correct the chromatic aberration in the spectacle overall lens system.

Figure 2:
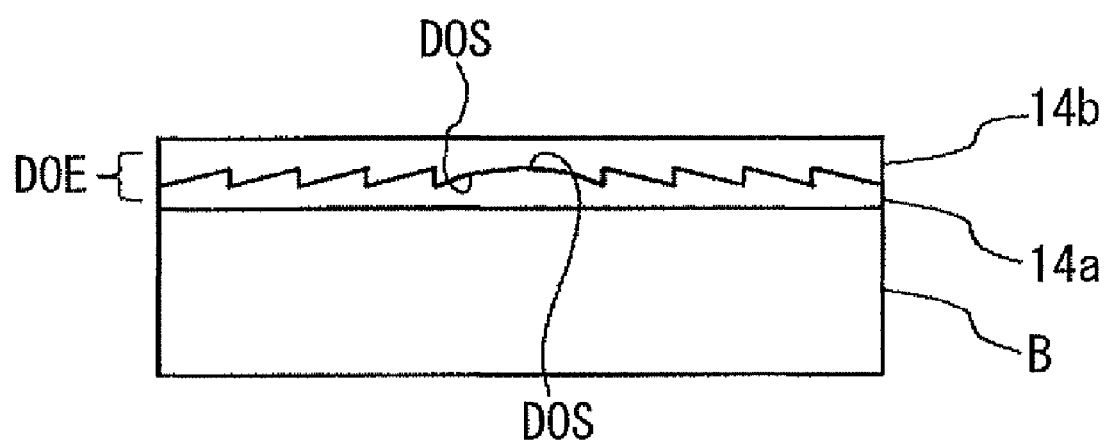
FIG. 2 is a schematic diagram showing an exemplary configuration of a multi-contact diffractive optical element.
Figure 3:
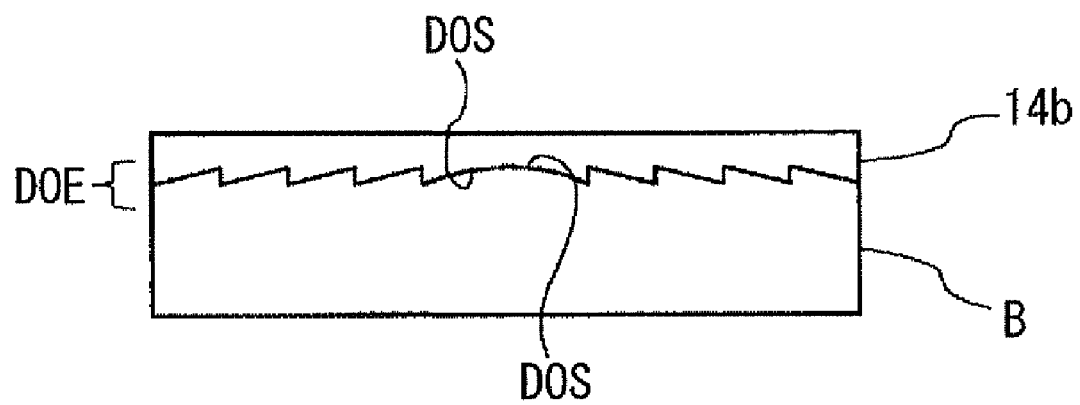
FIG. 3 is a schematic diagram showing another exemplary configuration of a multi-contact diffractive optical element.
Figure 4:
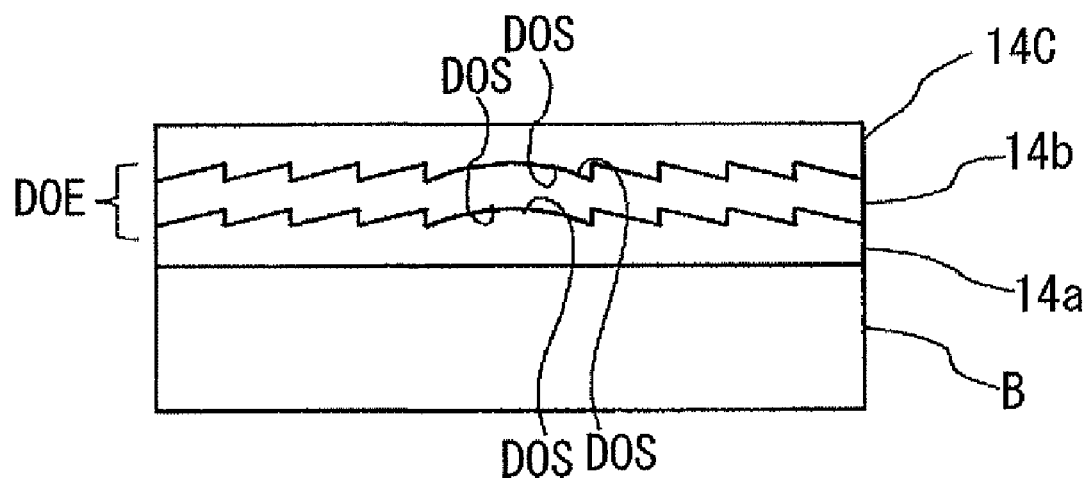
FIG. 4 is a schematic diagram showing still another exemplary configuration of a multi-contact diffractive optical element.

FIG. 2, FIG. 3, and FIG. 4 are schematic diagrams each showing an exemplary configuration of the multi-contact diffractive optical element.

In FIG. 2, FIG. 3, and FIG. 4, reference letters DOE denote a multi-contact diffractive optical element. Reference letter B denotes a base member on which the multi-contact diffractive optical element is to be formed. The base member B corresponds to the meniscus lens L1 shown in FIG. 1. In these figures, a surface of the base member B on which a multi-contact diffractive optical element DOE is formed (base surface) is depicted as a plain surface, and shapes of diffractive optical surfaces DOS possessed by the multi-contact diffractive optical element DOE is depicted rougher than they really are.

In the example shown in FIG. 2, two layers 14a, 14b are stacked on a surface of the base member B. Boundary surfaces of the layers 14a, 14b form the jagged diffractive optical surfaces DOS. The diffractive optical surfaces DOS in close contact with each other constitute the multi-contact diffractive optical element DOE. For the formation of the multi-contact diffractive optical element DOE onto the base member B, adoptable methods include: plastic molding by use of a mold; and attaching a prepared multi-contact diffractive optical element DOE of a film shape onto the base member B.

In the example shown in FIG. 3, a jagged relief pattern is formed in a surface of a base member B, and a single layer 14b is formed thereon in a closely contacted manner. Boundary surfaces of the base member B and the layer 14b form blazed-type diffractive optical surfaces DOS. The diffractive optical surfaces DOS in close contact with each other constitute a multi-contact diffractive optical element DOE. For the formation of the multi-contact diffractive optical element DOE onto the base member B, adoptable methods include plastic molding by use of a mold.

In the example shown in FIG. 4, three layers 14a, 14b, 14c are stacked on a surface of a base member B. Boundary surfaces of the layers 14a, 14b, 14c form blazed-type diffractive optical surfaces DOS. The diffractive optical surfaces DOS in close contact with each other constitute a multi-contact diffractive optical element DOE. For the formation of the multi-contact diffractive optical element DOE onto the base member B, adoptable methods include: plastic molding by use of a mold; and attaching a prepared multi-contact diffractive optical element DOE of a film shape onto the base member B.

Figure 5:
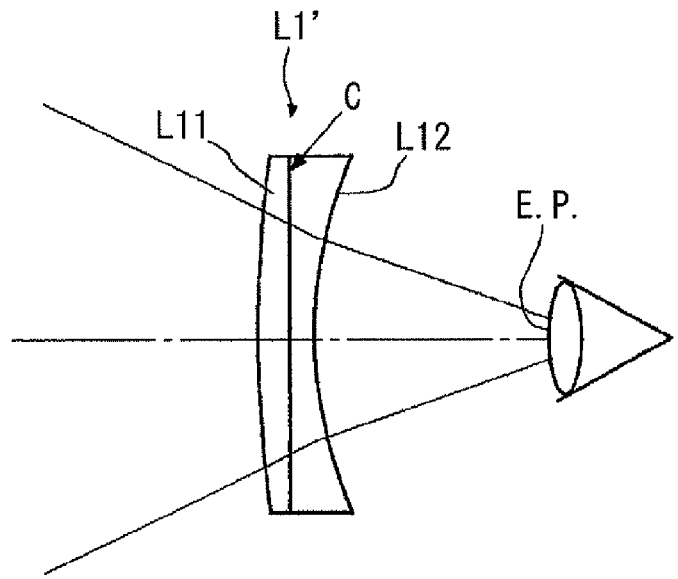
FIG. 5 is a diagram showing a modification of the spectacle lens of the embodiment.

In the above description, the meniscus lens L1 made of a single lens as shown in FIG. 1 has been taken by way of example. However, to add a function of a polarizing filter or the like to the spectacle lens, a cemented meniscus lens L1' may be used as shown in FIG. 5. In this case, the multi-contact diffractive optical element may be formed on a cementing surface C between an optical member L11 (polarizing filter) and an optical member L12 that constitute the cemented meniscus lens L1'.

As a configuration of the multi-contact diffractive optical element formed on the cementing surface C, the configuration shown in any of FIG. 2, FIG. 3, and FIG. 4 may be adopted. In this case, an adhesive for cementing the optical members L11, L12 may be used also for the topmost layer or the bottommost layer of the multi-contact diffractive optical element.

Next is a description of conditional formulae that the spectacle lens of the present embodiment should satisfy.

(First Conditional Formula)

A first conditional formula is a conditional formula (1) as follows:

$$V_d > 60 \qquad (1).$$

The conditional formula (1) is a conditional formula for making the image quality of the spectacle lens favorable. $V_d$ of the conditional formula (1) denotes an apparent Abbe number when the overall system of the spectacle lens including the multi-contact diffractive optical element is regarded as a single lens. $V_d$ is expressed by $V_d = |f_d/(f_F - f_C)|$ where $f_d$ is a focal length with respect to the d-line of the overall system, $f_F$ is a focal length with respect to the F-line, and $f_C$ is a focal length with respect to the C-line.

Incidentally, if a chromatic aberration correction by the multi-contact diffractive optical element is perfect, then $f_d/(f_F - f_C)$ is zero. If the chromatic aberration correction is made excessively, then the value of $f_d/(f_F - f_C)$ is negative. If the chromatic aberration correction is made insufficiently, then the value of $f_d/(f_F - f_C)$ is positive. By use of the multi-contact diffractive optical element, it is possible for the spectacle lens of the present embodiment to satisfy the conditional formula (1) without using extra-low dispersion glass.

If the apparent Abbe number $V_d$ does not satisfy the conditional formula (1), then large chromatic aberration remains in the spectacle lens, leading to a decrease in image quality.

Furthermore, to sufficiently enhance the image quality, it is desirable that the apparent Abbe number $V_d$ satisfy conditional formula (3') instead of the conditional formula (1).

$$V_d > 150 \qquad (3')$$

However, because resolution of a human eye is limited, the apparent Abbe number $V_d$ not less than a certain value results in overquality. Therefore, the apparent Abbe number $V_d$ may be kept in the range defined by a conditional formula (3").

$$V_d < 500 \qquad (3'')$$

(Second Conditional Formula)

A second conditional formula is a conditional formula (2) as follows:

$$0.005 < \Delta N_d < 0.45 \qquad (2).$$

The conditional formula (2) is one of the conditional formulae which are required by the multi-contact diffractive optical element for serving its functions (that is, highness in diffraction efficiency over a wide band, and highness in mass producibility). $\Delta N_d$ of the conditional formula (2) denotes a refractive index difference with respect to the d-line between the two layers in close contact with each other, especially a refractive index difference in the vicinity of the boundary between the two layers. The magnitude relation between the refractive indices of the two layers does not matter. However, to obtain a high diffraction efficiency over a wide band, the refractive index difference $\Delta N_d$ between the two layers needs to be large. In addition, to suppress error sensitivity of the diffractive optical surface, the refractive index difference $\Delta N_d$ needs to be not too large.

To be more specific, if the refractive index difference $\Delta N_d$ is not less than the upper limit (0.45) of the conditional formula (2), the error sensitivity is too high. On the other hand, if the refractive index difference $\Delta N_d$ is not greater than the lower limit (0.005) of the conditional formula (2), the grating height for satisfying the blaze condition is too high. This leads to an increase in scattered rays occurring on a rising surface of each grating, resulting in an increase in stray light. Furthermore, if the grating height is too high, it is difficult to form a diffractive optical surface. The "rising surface" here refers to one of the two inclined surfaces forming a blazed-type grating, with a smaller angle to the normal of the base surface, that is, a steeper inclined surface. The rising surface is also referred to as "grating longitudinal surface," "wall of grating," or "non-diffraction surface."

In addition, to further decrease the error sensitivity, it is desirable that the refractive index difference $\Delta N_d$ satisfy a conditional formula (1').

$$0.005 < \Delta N_d < 0.2 \tag{1'}$$

(Third Conditional Formula)

A third conditional formula is a conditional formula (3) as follows:

$$\Delta N_F < \Delta N_C \tag{3}$$

The conditional formula (3) is one of the conditional formulae which are required by the multi-contact diffractive optical element for serving its functions (especially, highness in diffraction efficiency over a wide band). $\Delta N_F$ of the conditional formula (3) is a refractive index difference with respect to the F-line of the two layers in close contact with each other. $\Delta N_C$ is a refractive index difference with respect to the C-line therebetween. If the refractive index differences $\Delta N_F$, $\Delta N_C$ satisfy the conditional formula (3), a balance between the refractive indices and the dispersions of the two layers in close contact with each other becomes favorable. Therefore, a high diffraction efficiency is obtained over a wide band. However, if the refractive index differences $\Delta N_F$, $\Delta N_C$ do not satisfy the conditional formula (3), the balance is lost, resulting in lack of diffraction efficiency.

(Fourth Conditional Formula)

A fourth conditional formula is a conditional formula (4) as follows:

$$(E_g + E_C)/2 > 0.9 \times E_d \tag{4}$$

The conditional formula (4) is a conditional formula for making the image quality of the spectacle lens favorable. $E_g$, $E_d$, and $E_C$ of the conditional formula (4) are a diffraction efficiency with respect to the g-line of the multi-contact diffractive optical element, a diffraction efficiency with respect to the d-line thereof, and a diffraction efficiency with respect to the C-line thereof, respectively. If the diffraction efficiencies $E_g$, $E_d$, $E_C$ do not satisfy the conditional formula (4), the flare is large. By use of the multi-contact diffractive optical element, it is possible for the spectacle lens of the present embodiment to satisfy the conditional formula (4).

To further enhance the image quality, it is desirable that a conditional formula (4') be adopted instead of the conditional formula (4).

$$(E_g + E_C)/2 > 0.98 \times E_d \tag{4'}$$

(Fifth Conditional Formula)

A fifth conditional formula is a conditional formula (5) as follows:

$$-10.0 < \Delta N_d / \Delta (N_F - N_C) < -2.0 \tag{5}$$

The conditional formula (5) is one of the conditional formulae which are required by the multi-contact diffractive optical element for serving its functions (especially, highness in diffraction efficiency over a wide band). $\Delta(N_F - N_C)$ of the conditional formula (5) is a difference between main dispersions $(N_F - N_C)$ of the two layers in close contact with each other. If the conditional formula (5) is not satisfied, it is not possible for the multi-contact diffractive optical element to obtain a high diffraction efficiency over a wide band. To sufficiently obtain the functions, it is desirable that a following conditional formula (5') be satisfied instead of the conditional formula (5).

$$-8 < \Delta N_d / \Delta (N_F - N_C) < -2.0 \tag{5'}$$

(Sixth Conditional Formula)

A sixth conditional formula is a conditional formula (6) as follows:

$$0.05 < h/d < 2.0 \tag{6}$$

The conditional formula (6) is a conditional formula which is required by the multi-contact diffractive optical element for serving its functions (highness in diffraction efficiency over a wide band, and highness in mass producibility), especially a conditional formula relating to a grating height. In the conditional formula (6), "h" is a grating height, and "d" is the shorter of the axial thicknesses of the aforementioned two layers. If h/d is not less than the upper limit (2.0) of the conditional formula (6), the grating height is relatively too high. This leads to a thicker rising surface, more scattered rays occurring thereon, and more stray light. In addition, if the grating height is too high, it is difficult to form a diffractive optical surface. On the other hand, if h/d is not greater than the lower limit (0.05) of the conditional formula (6), the aforementioned two layers are relatively too thick, making it also difficult to form a diffractive optical surface. In addition, if the aforementioned two layers are too thick, an absorption amount of light in the multi-contact diffractive optical element increases, resulting in inconveniences such as a greater likelihood of occurrence of chromatism and an increase in a transmittance of the overall lens system.

To further enhance the functions of the multi-contact diffractive optical element, it is preferable that a conditional formula (6') be adopted instead of the conditional formula (6).

$$0.2 < h/d < 1.0 \tag{6'}$$

(Seventh Conditional Formula)

A seventh conditional formula is a conditional formula (7) as follows:

$$2 \mu m < \Delta_{mx} < 30 \mu m \tag{7}$$

Figure 6:
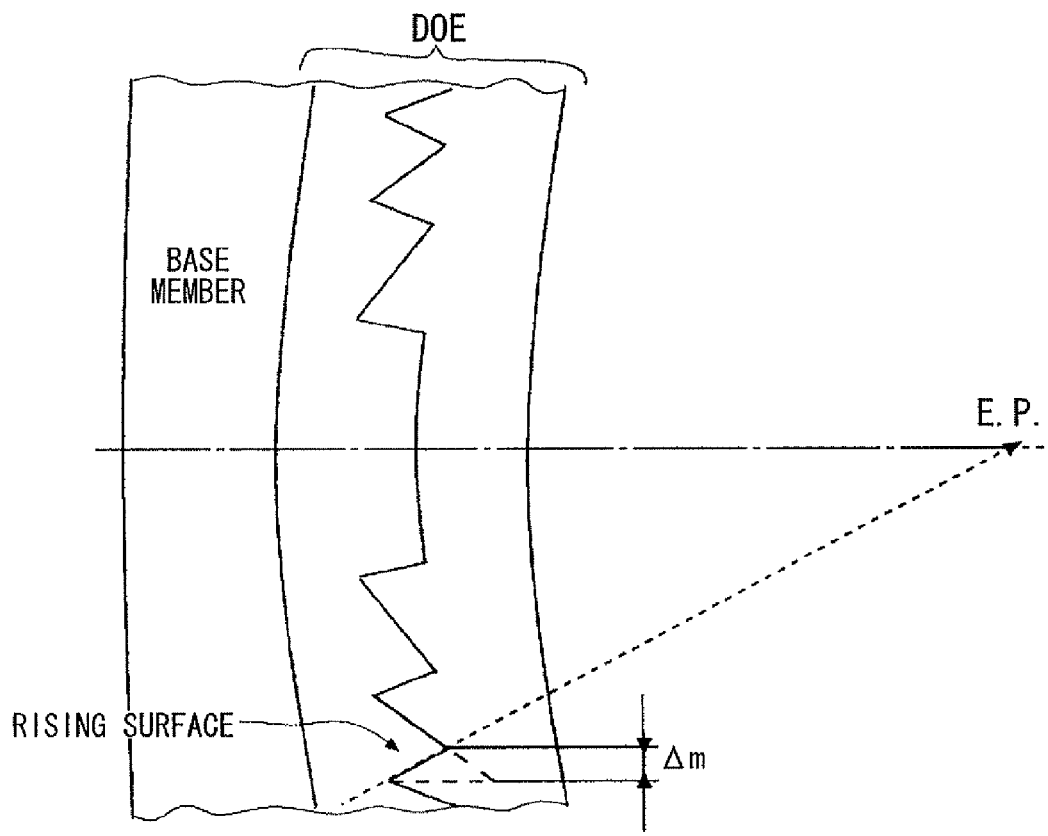
FIG. 6 is a diagram for explaining an example in the case of providing a rising surface with an inclination.

The conditional formula (7) is a conditional formula which is required by the multi-contact diffractive optical element for serving its functions (highness in diffraction efficiency over a wide band, and highness in mass producibility), especially a conditional formula relating to a grating inclination angle (an inclination angle from the optical axis direction). To reduce scattered light occurring on a rising surface of each grating, it is desirable that the rising surface be provided with an inclination such as along a main light ray of a light flux going toward the pupil (see FIG. 6). In this case, as shown in FIG. 6, the grating inclination angle becomes larger with the distance from the optical axis. A length $\Delta_m$ in the direction perpendicular to the optical axis of the rising surface of the grating also becomes larger with the distance from the optical axis. If a maximum value $\Delta_{mx}$ of the length $\Delta_m$ on the diffractive optical surface (that is, a length $\Delta_m$ of a rising surface of a grating formed along the outermost periphery) satisfies the present conditional formula (7), all the grating inclination angles on the diffractive optical surface are appropriately maintained. If the maximum value $\Delta_{mx}$ is not less than the upper limit of 30 μm, then both of the grating inclination angle and the area of the rising surface of the grating are increased, leading to an increased amount of produced stray light. If the maximum value $\Delta_{mx}$ is not more than the lower limit of 2 μm, then not only an improvement effect on the diffraction efficiency of the multi-contact diffractive optical element is diminished, but also a draft angle is made small. This results in the inconvenience of difficulty in fabricating a multi-contact diffractive optical element.

To sufficiently exert an effect of this conditional formula (7), it is desirable that the upper limit of the conditional formula (7) be 15 μm and that the lower limit thereof be 3 μm. It is more desirable that the upper limit of the conditional formula (7) be 12 μm and that the lower limit thereof be 4 μm. For example, if the formation target of the multi-contact diffractive optical element is a plane surface, its grating height is 20 μm, and the incident angle of light is 20 degrees, then it is desirable that the setting be $\Delta_{mx}$=6.43 μm or the like.

To further suppress scattered rays, the rising surfaces may be subjected to a black oxide treatment.

Incidentally, to provide the rising surfaces with an inclination, the materials for the two layers of the multi-contact diffractive optical element in close contact with each other may be selected as the following.

Figure 7:
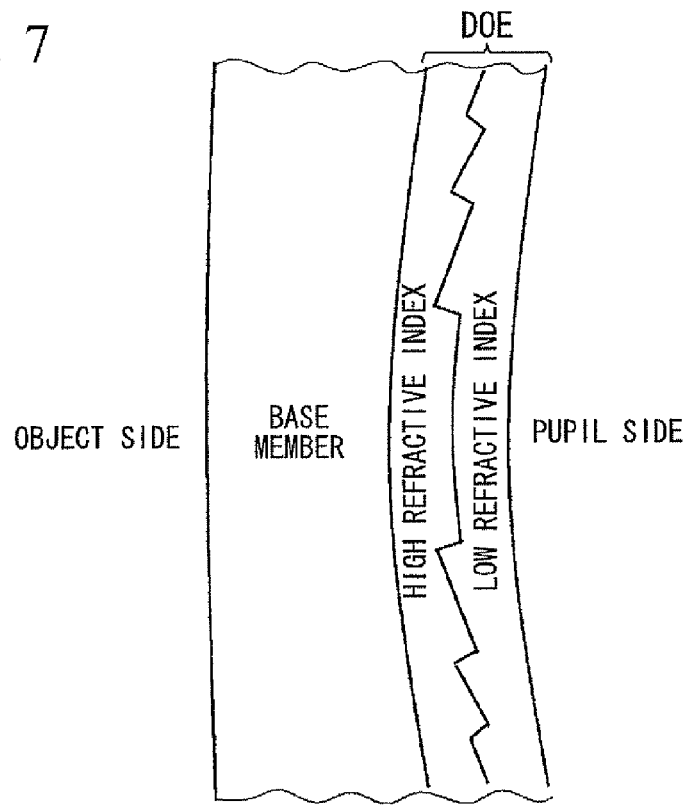
FIG. 7 is a diagram for explaining an example of selection method of materials for two layers.

For example, if the optical power of the multi-contact diffractive optical element is negative, and also the formation target of the multi-contact diffractive optical element is a surface on the pupil side of the base member (for example, the surface SB of FIG. 1), then a material with a high refractive index is used for the layer on the base member of the multi-contact diffractive optical and a material with a low refractive index is used for the layer on the pupil side as shown in FIG. 7. With the materials of the two layers in close contact with each other being selected in this manner, the inclination of the rising surface acts in the direction of enlarging the angle of the tip of the grating. As a result, in the plastic molding using a mold, the diffractive optical surface is provided with a draft angle, leading to an increase in mass producibility.

Figure 8:
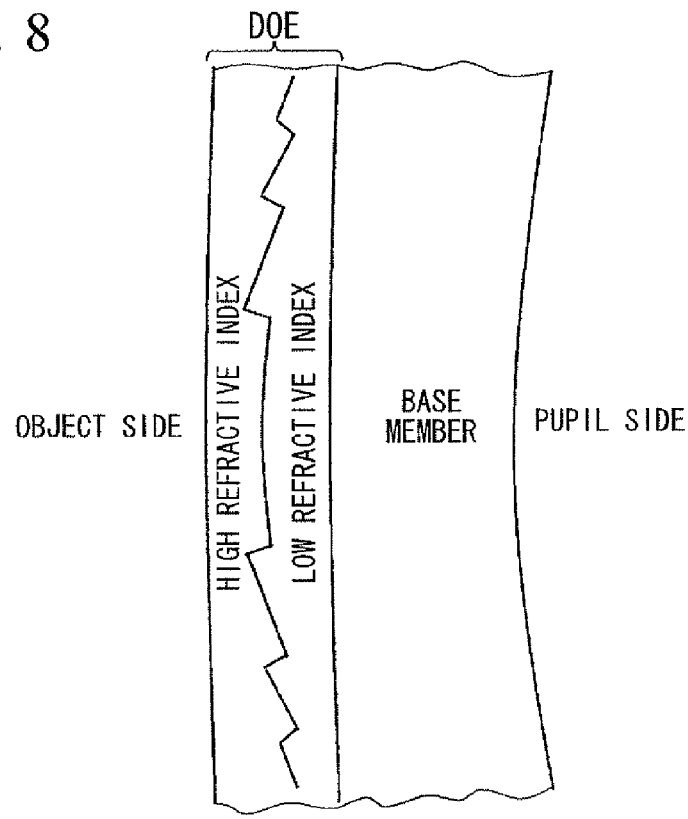
FIG. 8 is a diagram for explaining an example of selection method of materials for two layers under other conditions.

On the other hand, if the optical power provided to the multi-contact diffractive optical element is negative, and also the formation target of the multi-contact diffractive optical element is a surface on the object side of the base member (for example, the surface SA of FIG. 1), then a material with a low refractive index is used for the layer on the base member side of the multi-contact diffractive optical element and a material with a high refractive index is used for the layer on the object side, as shown in FIG. 8. With the materials of the two layers in close contact with each other being selected in this manner, the inclination of the rising surface acts in the direction of enlarging the angle of the tip of the grating. As a result, in the plastic molding using a mold, the diffractive optical surface is provided with a draft angle, leading to an increase in mass producibility.

If the optical power provided to the multi-contact diffractive optical element is positive, the order of the two layers in close contact with each other is opposite to that described above.

(Eighth Conditional Formula)

An eighth conditional formula is a conditional formula (8) as follows:

$$0.00005 < p/|f| < 0.02 \tag{8}$$

The conditional formula (8) is a conditional formula which is required by the multi-contact diffractive optical element for serving its functions (highness in diffraction efficiency over a wide band, and highness in mass producibility), especially a conditional formula relating to a grating pitch. In the conditional formula (8), p is a minimum pitch (a grating pitch along the outermost periphery), and f is a focal length of the overall lens system. If p/|f| is not more than the lower limit (0.00005) of the conditional formula (8), then the grating pitch is too small. As a result, it is difficult to form a diffractive optical surface. In addition, this leads to a decrease in diffraction efficiency. Consequently, the flare light is produced, decreasing the image quality. On the other hand, if p/|f| is not less than the upper limit (0.02) of the conditional formula (8), then the grating pitch is too large, thus failing in sufficient achromatism. As a result, the image quality is likely to be decreased.

To further enhance the functions of the multi-contact diffractive optical element, it is preferable that a conditional formula (8') be adopted instead of the conditional formula (8).

$$0.0001 < p/|f| < 0.01 \tag{8'}$$

(Ninth Conditional Formula)

A ninth conditional formula is a conditional formula (9) as follows:

$$\Delta/|f| < 0.05 \tag{9}$$

The conditional formula (9) is a conditional formula for making the image quality of the spectacle lens favorable. In the conditional formula (9), $\Delta$ is a maximum expansion width of axial chromatic aberration of the d-line, the g-line, the C-line, and the F-line. If the spectacle lens satisfies the conditional formula (9), the axial chromatic aberration is sufficiently small, obtaining favorable imaging performance. If the spectacle lens does not satisfy conditional formula (9), the axial chromatic aberration is too large, producing chromatism.

To further enhance the image quality, it is desirable that a conditional formula (9') be adopted instead of conditional formula (9).

$$\Delta/|f| < 0.02 \tag{9'}$$

However, it is substantially impossible to completely nullify the axial chromatic aberration. Therefore, actual $\Delta/|f|$ may be considered to remain in the range defined by the conditional formula (9").

$$\Delta/|f| > 0.0001 \tag{9''}$$

(Tenth Conditional Formula)

A tenth conditional formula is a conditional formula (10) as follows:

$$0.0001 < C(d_1+d_2)/f^2 < 2.0 \tag{10}$$

The conditional formula (10) is a conditional formula which is required by the multi-contact diffractive optical element for serving its functions (highness in diffraction efficiency over a wide band, and highness in mass producibility), especially a conditional formula relating to a layer thickness. In the conditional formula (10), $d_1$ and $d_2$ are layer thicknesses of the two layers in close contact with each other, and C is an effective diameter of the multi-contact diffractive optical element. Therefore, $C(d_1+d_2)/f^2$ refers to a volume of the multi-contact diffractive optical element normalized by the focal length (a normalization volume). If the normalization volume $C(d_1+d_2)/f^2$ is not less than the upper limit (2.0) of the conditional formula (10), the volume of the multi-contact diffractive optical element is too large. This leads to an increased absorption amount of light in the multi-contact diffractive optical element. Consequently, chromatism and a decrease in transmittance in the overall lens system are likely to occur. Furthermore, a too large volume of the multi-contact diffractive optical element leads to an increase in manufacturing cost. In addition, if the normalization volume $C(d_1+$ $d_2)/f^2$ is not more than the lower limit (0.0001) of the conditional formula (10), the multi-contact diffractive optical element is too thin. As a result, a sufficient diffraction effect is not obtained, resulting in deficiency in effect of achromatism.

To further enhance the functions of the multi-contact diffractive optical element, it is preferable that a conditional formula (10') be adopted instead of the conditional formula (10).

$$0.0001 < C(d_1+d_2)/f^2 < 0.01 \qquad (10')$$

As described above, the spectacle lens of the present embodiment satisfies the conditional formulae for enhancing the image quality and the conditional formulae for allowing the functions of the multi-contact diffractive optical element (highness in diffraction efficiency over a wide band, and highness in mass producibility) to be sufficiently exerted in the spectacle lens. Therefore, the spectacle lens of the present embodiment has high performance and also high mass producibility.

(Other Conditions)

In the spectacle lens of the present embodiment, in the case of forming a multi-contact diffractive optical element by plastic molding, it is desirable that the materials for the two layers in close contact with each other be photocurable resins (especially, UV curable resins), with emphasis being placed on mass producibility. Furthermore, to enhance mass producibility, it is desirable that the photocurable resin used for one of the two layers have a viscosity of not less than 40 cP in its uncured state, and that the viscosity of the photocurable resin used for the other have a viscosity of not less than 2000 cP in its uncured state. Furthermore, to reduce the size and weight of the spectacle lens, it is preferable that the specific gravities of the two layers be not more than 2.0. With a specific gravity smaller than that of glass, resins are effective for reducing the weight of the spectacle lens. To further reduce the weight, it is preferable that the specific gravity be kept at not more than 1.6.

Furthermore, for the position of wear of the spectacle lens of the present embodiment, it is desirable that the following condition be satisfied. That is, it is most preferable that the distance from the surface closest to the pupil side (the surface SB of FIG. 1) to the pupil (E.P.) be approximately 25 mm. It is desirable that the distance be at least within the range of 20 mm to 30 mm. If the distance is within this range, the spectacle lens is not only made comfortably wearable and usable, but also is capable of exerting both excellent diffraction performance and excellent imaging performance.

Furthermore, at least one surface of the spectacle lens of the present embodiment may be an aspheric surface. Especially, it is preferable that the surface with which a positive optical power is to be provided be made an aspheric surface.

Furthermore, the spectacle lens of the present embodiment is either a spectacle lens in which a multi-contact diffractive optical element is formed on a single lens (see FIG. 1) or a spectacle lens in which a multi-contact diffractive optical element is formed on a cemented lens (FIG. 5). However, the spectacle lens may be modified into a spectacle lens in which a multi-contact diffractive optical element is formed on any optical member of the system made of a plurality of optical members. Furthermore, a gradient index lens, a lens made of a crystalline material, or the like may be applied to part or all of the optical members of the spectacle lens according the present embodiment.

Example 1

A first example of the spectacle lens will be described.

Figure 9:
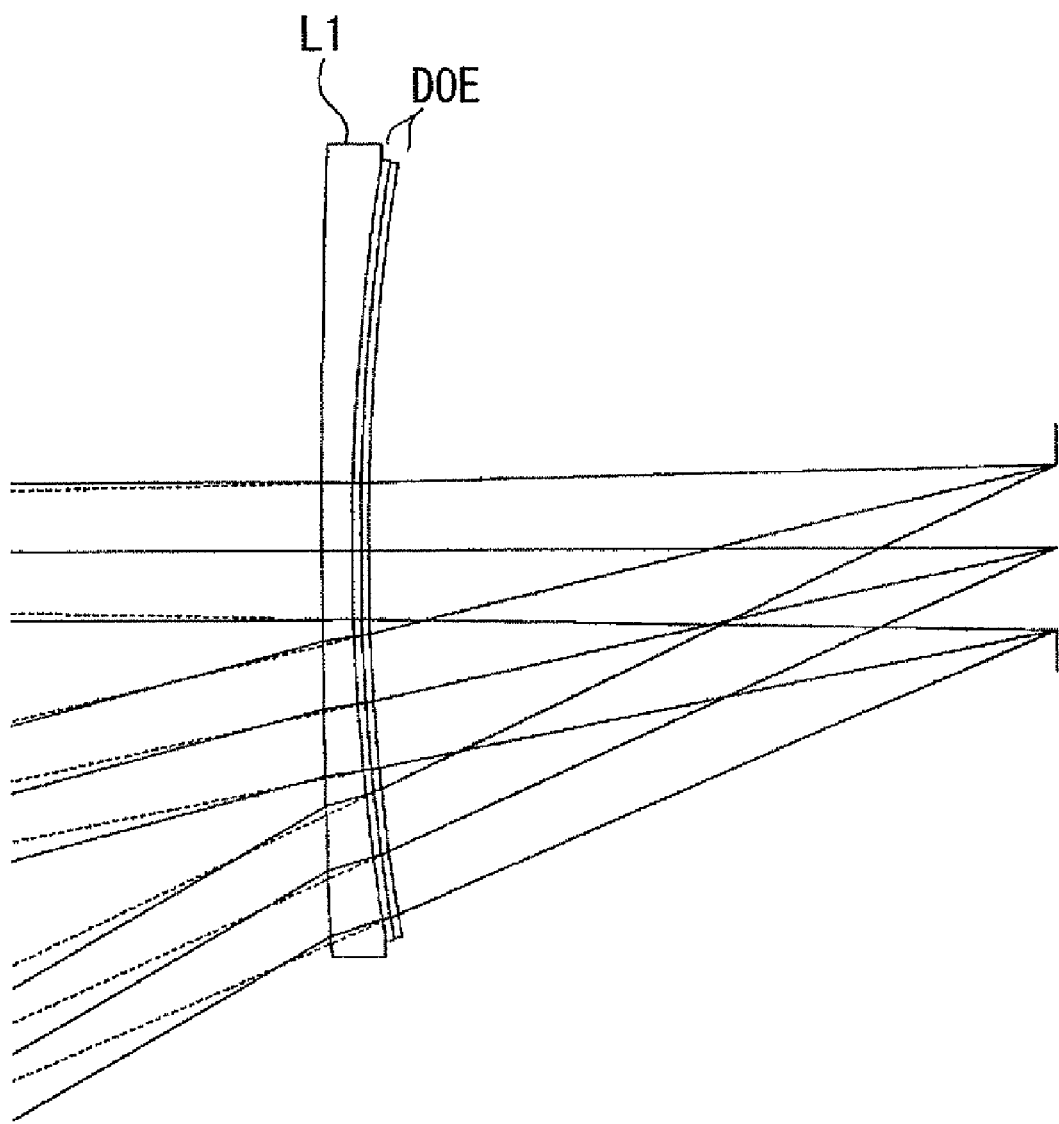
FIG. 9 is an optical path diagram of a spectacle lens of a first example.

FIG. 9 is an optical path diagram of the spectacle lens of the present example. As shown in FIG. 9, the spectacle lens of the present example is made of: a meniscus lens L1 convex toward the object side; and a multi-contact diffractive optical element DOE formed on the pupil side of the meniscus lens L1. The multi-contact DOE is two-layer type as shown in FIG. 2.

Table 1 shows lens data on the spectacle lens of the present example. In Table 1, m denotes a surface number, r denotes a curvature radius, "d" denotes a distance between surfaces, n(d) denotes a refractive index with respect to the d-line, n(g) denotes a refractive index with respect to the g-line, n(C) denotes a refractive index with respect to the C-line, and m(F) denotes a refractive index with respect to the F-line.

In Table 1, an asterisk ("*") is attached to the surface numbers of the diffractive optical surfaces. The shape of the diffractive optical surface is converted to that of an aspheric surface by the ultra-high index method. Details of the ultra-high index method is described on pp. 25-38 of Non-Patent Document 1 and the like. In the conversion, the refractive index of the d-line of the diffractive optical surface is set to 1001, and the refractive index of the g-line thereof is set to 7418.6853. Furthermore, a wavelength $\lambda_d$ of the d-line, a wavelength $\lambda_g$ of the g-line, a wavelength $\lambda_C$ of the C-line, and a wavelength $\lambda_F$ of the F-line are selected as follows:

$\lambda_d$=587.562 nm
$\lambda_g$=435.835 nm
$\lambda_C$=656.273 nm
$\lambda_F$=486.133 nm.

TABLE 1

| m | r | d | n(d) | n(g) | n(C) | n(F) |
|---|---|---|------|------|------|------|
| 0(OBJ) | 25.0000 | INFINITY | 1.000000 | 1.000000 | 1.000000 | 1.000000 |
| 1 | 355.56000 | 1.10000 | 1.802000 | 1.832190 | 1.795220 | 1.818380 |
| 2 | 84.82290 | 0.30000 | 1.527600 | 1.547700 | 1.523300 | 1.538500 |
| 3* | 84.82290 | 0.00000 | 10001.000000 | 7418.68530 | 11170.425500 | 8274.731100 |
| 4* | 84.82290 | 0.30000 | 1.556900 | 1.571100 | 1.553700 | 1.564800 |
| 5 | 84.82290 | 25.0000 | 1.000000 | 1.000000 | 1.000000 | 1.000000 |
| 6(STOP) | INFINITY | −149.44565 | 1.000000 | 1.000000 | 1.000000 | 1.000000 |

Note that a medium between the second surface and the third surface (=one of the two layers constituting the multi-contact diffractive optical element DOE) has a viscosity of 100 cP in its uncured state, and has a refractive index of 1.5276 with respect to the d-line. Furthermore, a medium between the fourth surface and the fifth surface (=the other of the two layers constituting the multi-contact diffractive optical element DOE) has a viscosity of 4800 cP in its uncured state, and has a refractive index of 1.5569 with respect to the d-line.

Table 2 shows data on the diffractive optical surface (fourth surface). The shape of the diffractive optical surface is defined by coefficients of the terms when an aspheric surface is expressed by a polynomial expression (11) (aspheric coefficients).

$$S(y)=(y^2/r)/\{1+(1-K\cdot y^2/r^2)^{1/2}\}+C_4\cdot y^4+C_6\cdot y^6+C_8\cdot y^8+C_{10}\cdot y^{10} \quad (11)$$

where y is a height in the direction perpendicular to the optical axis, S(y) is a sag amount (=a distance in the optical axis direction from a tangent plane at an apex of the aspheric surface) at the height y, r is a curvature radius at the apex of the aspheric surface, K is a cone coefficient, and $C_n$ is an n-th order aspheric coefficient. Note that Table 2 does not show coefficients whose value is zero.

TABLE 2

| m | K | C2 | C4 |
|---|---|---|---|
| 4 | 1.0000 | $4.2000 * 10^{-8}$ | $2.0000 * 10^{-11}$ |

The conditional corresponding values of the present example are as follows, where BF is a back focus, "D" is a diopter, and p is a grating pitch along the outermost periphery:

f=−124.558

$f_F$=0.03065

$f_C$=0.57604

BF=−124.446

D=1000/BF=−8.036

$E_g$=98.221

$E_C$=98.233

$E_d$=99.999

$\Delta(N_F-N_C)$=−0.00410 h=0.02 d=0.3 p=0.0443

C=26.9

$d_1+d_2$=0.6

$\Delta$=0.83016

$V_d$=228.4 in formula (1)

$\Delta N_d$=0.0293 in formula (2)

$\Delta N_F$=0.0263 in formula (3)

$\Delta N_c$=0.0304 in formula (3)

$(E_g+E_C)/2$=98.227 in formula (4)

$0.9 \times E_d$=89.999 in formula (4)

$\Delta N_d/\Delta(N_F-N_C)$=−7.146 in formula (5)

h/d=0.0667 in formula (6)

$\Delta_{mx}$=8.0 μm in formula (7)

p/|f|=0.00036 in formula (8)

$\Delta$/|f|=0.00666 in formula (9)

$C(d_1+d_2)/f^2$=0.00104 in formula (10).

That is, the spectacle lens of the present example satisfies all the conditional formulae (1) to (10).

Figure 10:
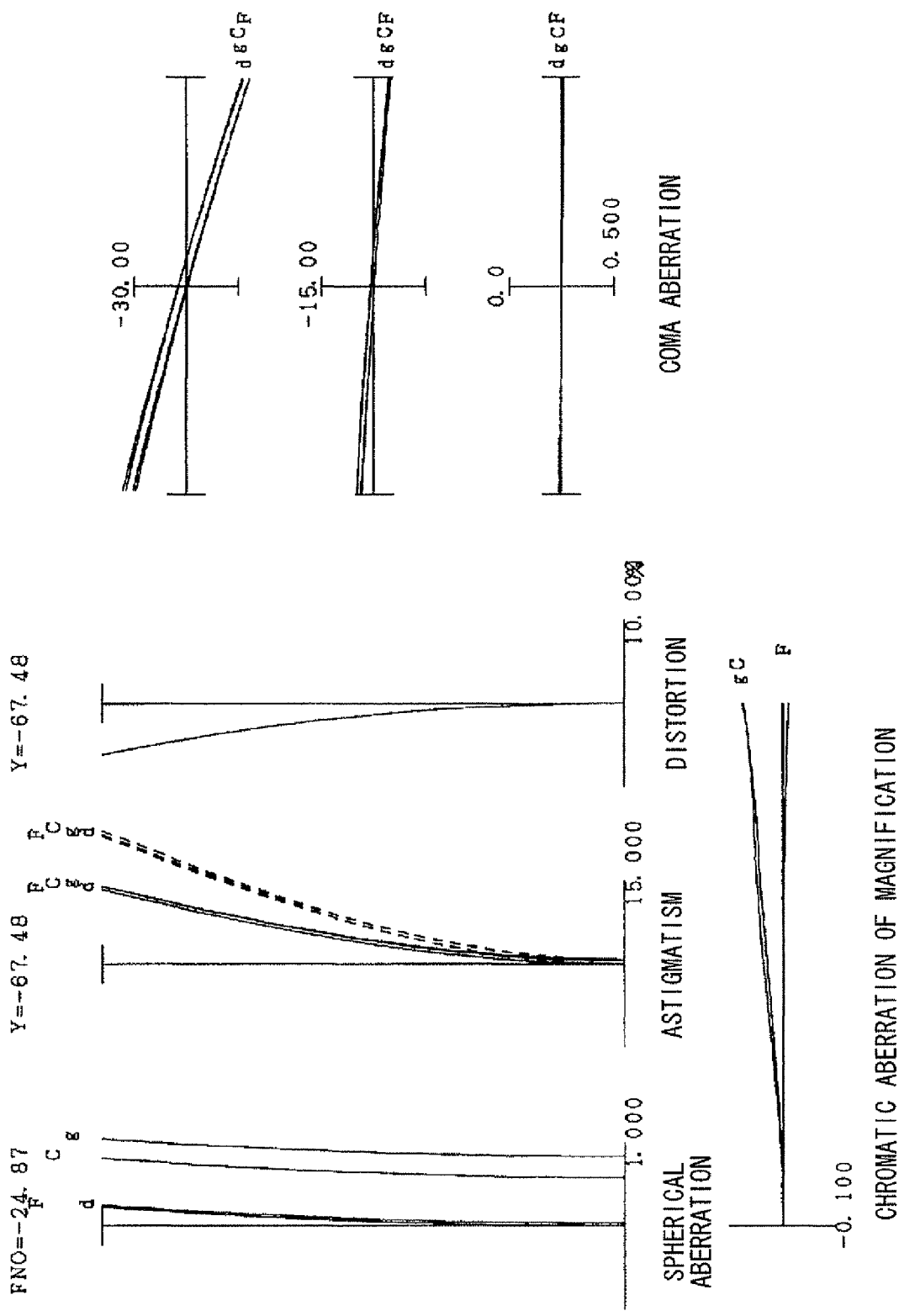
FIG. 10 is a diagram showing aberrations of the first example.

FIG. 10 is a diagram showing aberrations of the present example. In FIG. 10, FNO denotes an F number, and Y denotes an image height. In FIG. 10, "d" denotes a curve related to the d-line, "g" denotes a curve related to the g-line, C denotes a curve related to the C-line, and F denotes a curve related to the F-line. As shown in FIG. 10, in the present example, the aberrations are favorably corrected, and excellent imaging performance is obtained.

Example 2

A second example of the spectacle lens will be described.

Figure 11:
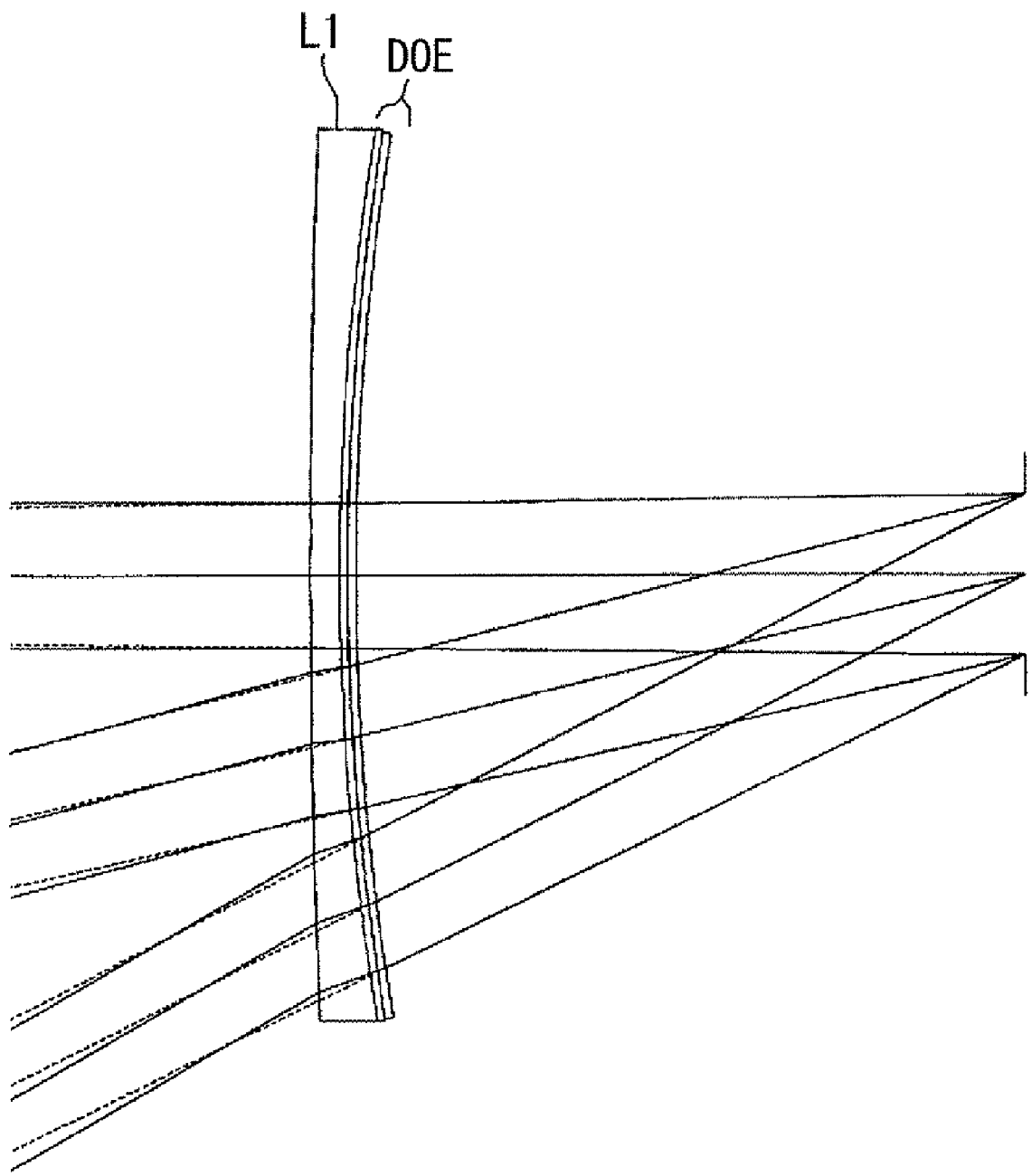
FIG. 11 is an optical path diagram of a spectacle lens of a second example.

FIG. 11 is an optical path diagram of the spectacle lens of the present example. As shown in FIG. 11, the spectacle lens of the present example is made of: a meniscus lens L1 convex toward the object side; and a multi-contact diffractive optical element DOE formed on the pupil side of the meniscus lens L1. The multi-contact diffractive optical element DOE is of two-layer type as shown in FIG. 2.

Table 3 shows lens data on the spectacle lens of the present example. The notation system of Table 3 is the same as that of Table 1. In addition, the conversion method by the ultra-high index method is also the same as that of the first example.

TABLE 3

| m | r | d | n(d) | n(g) | n(C) | n(F) |
|---|---|---|---|---|---|---|
| 0(OBJ) | 25.0000 | INFINITY | 1.000000 | 1.000000 | 1.000000 | 1.000000 |
| 1 | 400.00000 | 1.10000 | 1.524700 | 1.536490 | 1.521960 | 1.531290 |
| 2 | 100.00000 | 0.30000 | 1.527600 | 1.547700 | 1.523300 | 1.538500 |
| 3* | 100.00000 | 0.00000 | 10001.000000 | 7418.68530 | 11170.425500 | 8274.731100 |
| 4* | 100.00000 | 0.30000 | 1.556900 | 1.571100 | 1.553700 | 1.564800 |
| 5 | 100.00000 | 25.0000 | 1.000000 | 1.000000 | 1.000000 | 1.000000 |
| 6(STOP) | INFINITY | −262.34455 | 1.000000 | 1.000000 | 1.000000 | 1.000000 |

Note that a medium between the second surface and the third surface (=one of the two layers constituting the multi-contact diffractive optical element DOE) has a viscosity of 100 cP in its uncured state, and has a refractive index of 1.5276 with respect to the d-line. Furthermore, a medium between the fourth surface and the fifth surface (=the other of the two layers constituting the multi-contact diffractive optical element DOE) has a viscosity of 4800 cP in its uncured state, and has a refractive index of 1.5569 with respect to the d-line.

Table 4 shows data on the diffractive optical surface (fourth surface). The notation system of Table 4 is the same as that of Table 2.

TABLE 4

| m | K | C2 | C4 |
|---|---|---|---|
| 4 | 1.0000 | $1.4000 * 10^{-8}$ | $5.0000 * 10^{-12}$ |

The conditional corresponding values of the present example are as follows:

$f = -237.694$ $f_F = 0.05598$ $f_C = 0.68738$ $BF = -237.345$ $D = 1000/BF = -4.213$ $E_g = 98.221$ $E_C = 98.233$ $E_d = 99.999$ $\Delta(N_F - N_C) = -0.00410$ $h = 0.02$ $d = 0.3$ $p = 0.0388$ $C = 29.8$ $d_1 + d_2 = 0.6$ $\Delta = 0.89521$ $V_d = 376.46$ in formula (1)

$\Delta N_d = 0.0293$ in formula (2)

$\Delta N_F = 0.0263$ in formula (3)

$\Delta N_c = 0.0304$ in formula (3)

$(E_g + E_C)/2 = 98.227$ in formula (4)

$0.9 \times E_d = 89.999$ in formula (4)

$\Delta N_d / \Delta(N_F - N_C) = -7.146$ in formula (5)

$h/d = 0.0667$ in formula (6)

$\Delta_{mx} = 9.1$ μm in formula (7)

$p/|f| = 0.00016$ in formula (8)

$\Delta/|f| = 0.00377$ in formula (9)

$C(d_1 + d_2)/f^2 = 0.000316$ in formula (10).

That is, the spectacle lens of the present example satisfies all the conditional formulae (1) to (10).

Figure 12:
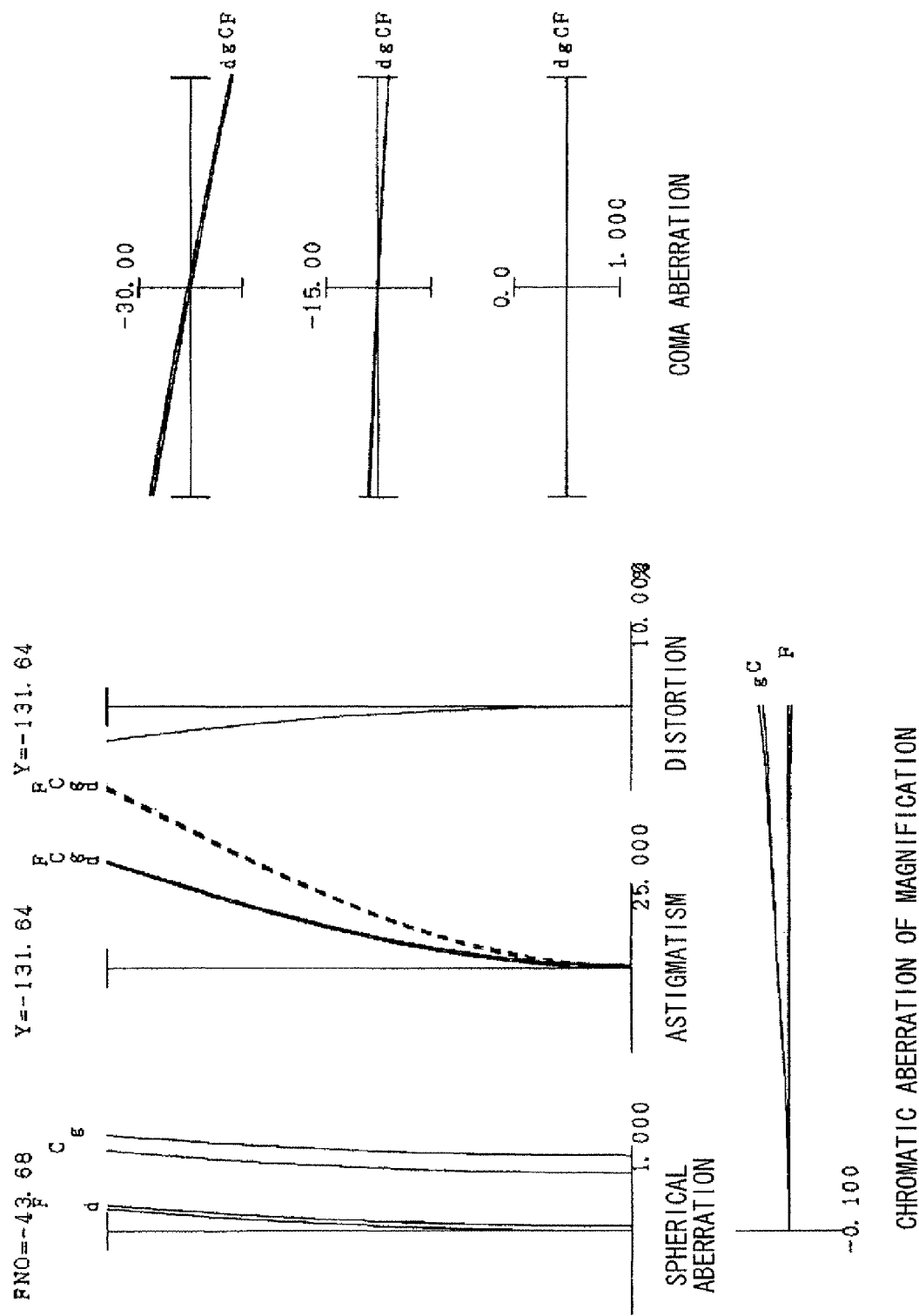
FIG. 12 is a diagram showing aberrations of the second example.

FIG. 12 is a diagram showing aberrations of the present example. The notation system of FIG. 12 is the same as that of FIG. 10. As shown in FIG. 12, in the present example, the aberrations are favorably corrected, and excellent imaging performance is obtained.

Example 3

A third example of the spectacle lens will be described.

Figure 13:
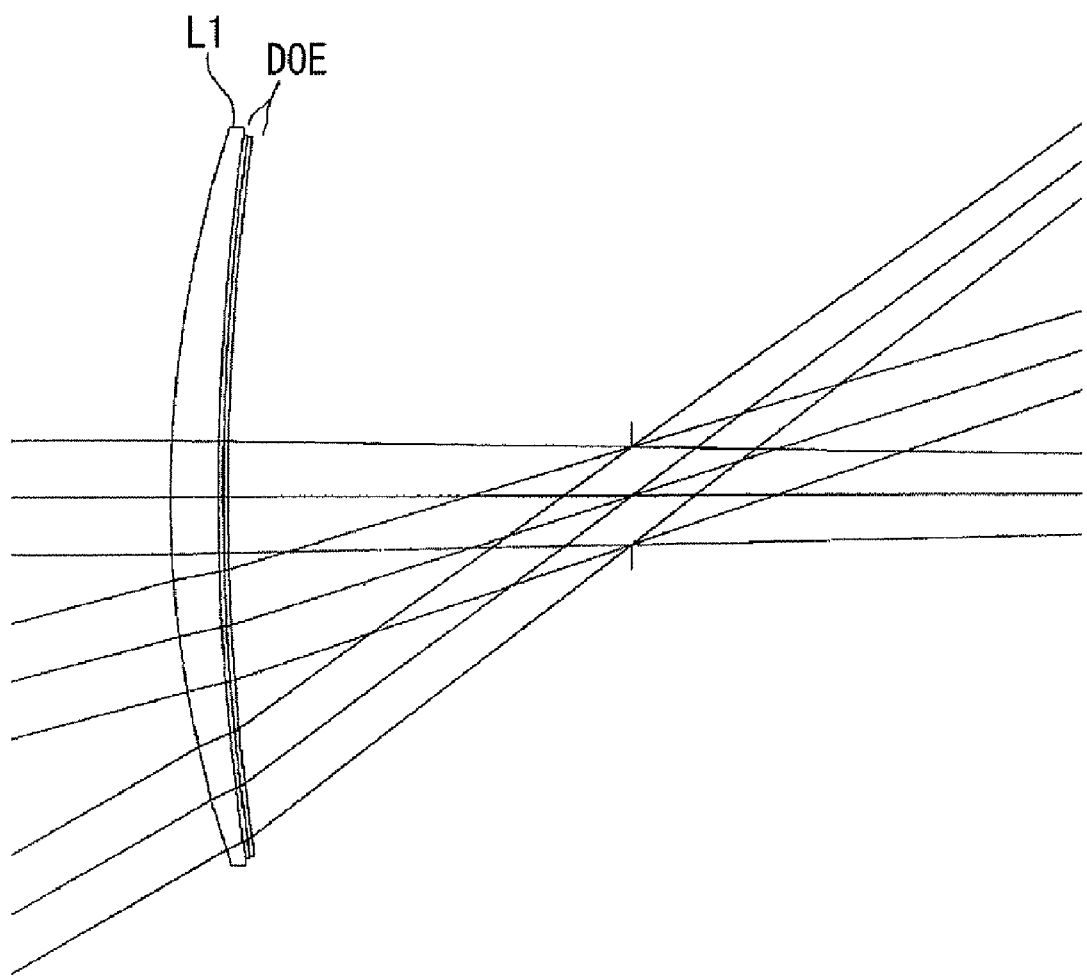
FIG. 13 is an optical path diagram of a spectacle lens of a third example.

FIG. 13 is an optical path diagram of the spectacle lens of the present embodiment. As shown in FIG. 13, the spectacle lens of the present example is made of: a meniscus lens L1 convex toward the object side; and a multi-contact diffractive optical element DOE formed on the pupil side of the meniscus lens L1. The multi-contact DOE is of two-layer type (dual type) as shown in FIG. 2.

Table 5 shows lens data on the spectacle lens of the present example. The notation system of Table 5 is the same as that of Table 1. In addition, the conversion method by the ultra-high index method is also the same as that of the first example.

TABLE 5

| m | r | d | n(d) | n(g) | n(C) | n(F) |
|---|---|---|---|---|---|---|
| 0(OBJ) | 25.0000 | INFINITY | 1.000000 | 1.000000 | 1.000000 | 1.000000 |
| 1 | 70.00000 | 3.00000 | 1.582760 | 1.607990 | 1.577240 | 1.596450 |
| 2 | 150.00000 | 0.30000 | 1.527600 | 1.547700 | 1.523300 | 1.538500 |
| 3* | 150.00000 | 0.00000 | 10001.000000 | 7418.68530 | 11170.425500 | 8274.731100 |
| 4* | 150.00000 | 0.30000 | 1.556900 | 1.571100 | 1.553700 | 1.564800 |
| 5 | 150.00000 | 25.0000 | 1.000000 | 1.000000 | 1.000000 | 1.000000 |
| 6(STOP) | INFINITY | 165.77362 | 1.000000 | 1.000000 | 1.000000 | 1.000000 |

Note that a medium between the second surface and the third surface (=one of the two layers constituting the multi-contact diffractive optical element DOE) has a viscosity of 100 cP in its uncured state, and has a refractive index of 1.5276 with respect to the d-line. Furthermore, a medium between the fourth surface and the fifth surface (=the other of the two layers constituting the multi-contact diffractive optical element DOE) has a viscosity of 4800 cP in its uncured state, and has a refractive index of 1.5569 with respect to the d-line.

Table 6 shows data on the diffractive optical surface (fourth surface). The notation system of Table 6 is the same as that of Table 2.

TABLE 6

| m | K | C2 | C4 |
|---|---|---|---|
| 4 | 1.0000 | $-3.2000 * 10^{-8}$ | $-2.0000 * 10^{-12}$ |

The conditional corresponding values of the present example are as follows:

$f = 194.476$ $f_F = 0.01476$ $f_C = -1.10663$ $BF = 190.774$ $D = 1000/BF = 5.242$ $E_g = 8.221$ $E_C = 98.233$ $E_d = 99.999$ $\Delta(N_F - N_C) = -0.00410$ $h = 0.02$ d=0.3 p=0.0408

C=42.6

$d_1+d_2$=0.6

Δ=1.37974

$V_d$=−173.424 in formula (1)

$\Delta N_d$=0.0293 in formula (2)

$\Delta N_F$=0.0263 in formula (3)

$\Delta N_C$=0.0304 in formula (3)

$(E_g+E_C)/2$=98.227 in formula (4)

$0.9 \times E_d$=89.999 in formula (4)

$\Delta N_d/\Delta(N_F-N_C)$=−7.146 in formula (5)

h/d=0.0667 in formula (6)

$\Delta_{mx}$=13.7 μm in formula (7)

p/|f|=0.00021 in formula (8)

Δ/|f|=0.00709 in formula (9)

$C(d_1+d_2)/f^2$=0.00068 in formula (10)

That is, the spectacle lens of the present example satisfies all the conditional formulae (1) to (10).

Figure 14:
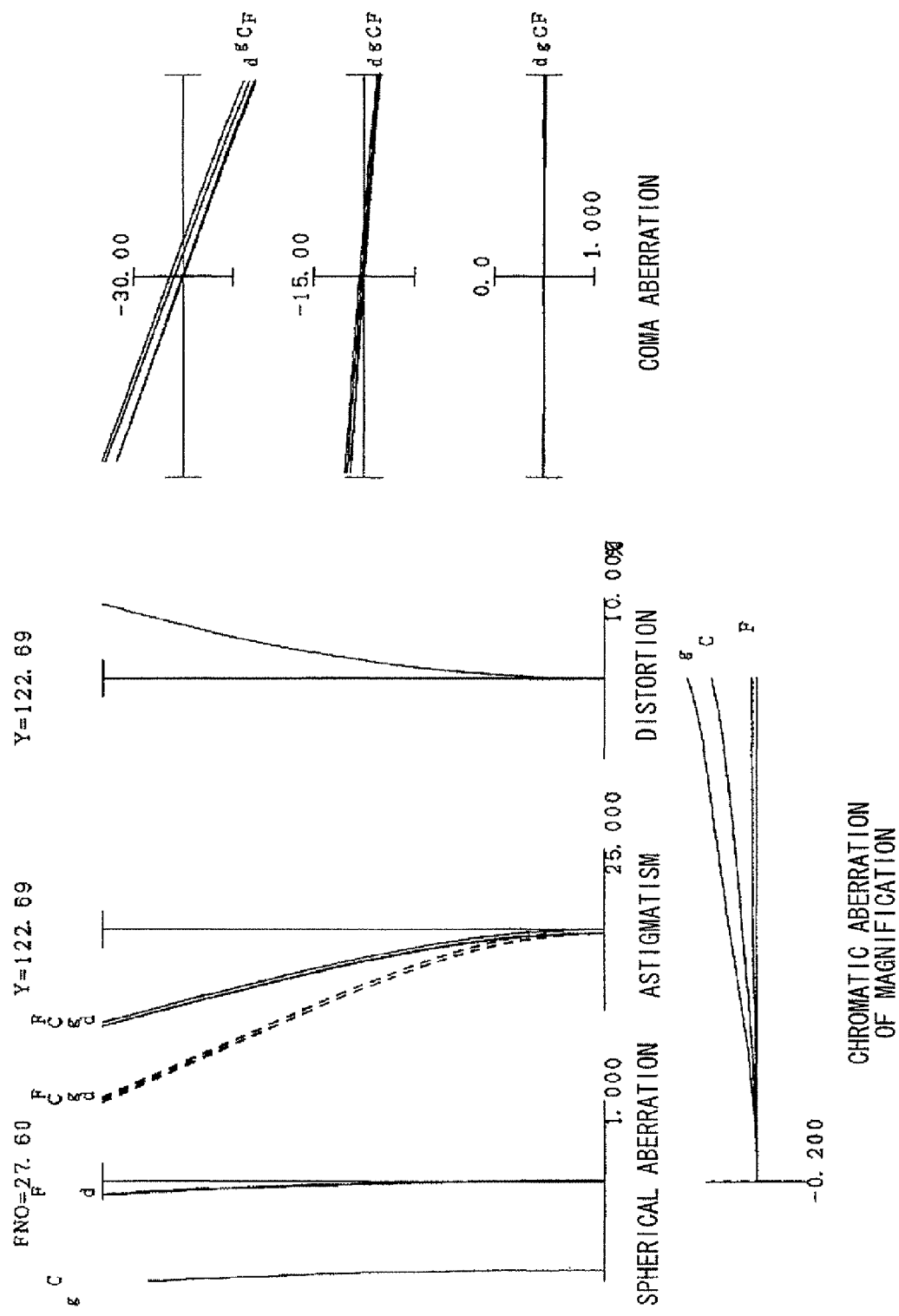
FIG. 14 is a diagram showing aberrations of the third example.

FIG. 14 is a diagram showing aberrations of the present example. The notation system of FIG. 14 is the same as that of FIG. 10. As shown in FIG. 14, in the present example, the aberrations are favorably corrected, and excellent imaging performance is obtained.

What is claimed is:

1. A spectacle lens comprising:
   a multi-contact diffractive optical element formed on at least one surface in an overall lens system that is arranged between an object and a pupil, wherein
   an apparent Abbe number $V_d$ when the overall lens system including the multi-contact diffractive optical element is regarded as a single lens satisfies $$V_d > 60 \quad (1).$$

2. The spectacle lens according to claim 1, wherein
   a refractive index difference $\Delta N_d$ with respect to a d-line between two layers of the multi-contact diffractive optical element in close contact with each other satisfies $$0.005 < \Delta N_d < 0.45 \quad (2)$$

at least in a vicinity of an interface between the two.

3. The spectacle lens according to claim 1, wherein
   one of the two layers of the multi-contact diffractive optical element in close contact with each other is made of a material with a high refractive index and a low dispersion, and the other of the two layers is made of a material with a low refractive index and a high dispersion, and
   a refractive index difference $\Delta N_F$ with respect to an F-line between the two layers and a refractive index difference $\Delta N_C$ with respect to a C-line therebetween satisfy $$\Delta N_F < \Delta N_C \quad (3).$$

4. The spectacle lens according to claim 1, wherein
   a diffraction efficiency $E_d$ with respect to a d-line of the multi-contact diffractive optical element, a diffraction efficiency $E_g$ with respect to a g-line, and a diffraction efficiency $E_C$ with respect to a C-line satisfy $$(E_g+E_C)/2 > 0.9 \times E_d \quad (4).$$

5. The spectacle lens according to claim 1, wherein
   a difference $\Delta(N_F-N_C)$ in a main dispersion $(N_F-N_C)$ between the two layers of the multi-contact diffractive optical element in close contact with each other, and a refractive index difference $\Delta N_d$ with respect to a d-line therebetween satisfy $$-10.0 < \Delta N_d/\Delta(N_F-N_C) < -2.0 \quad (5).$$

6. The spectacle lens according to claim 1, wherein
   an axial thickness "d", which is a smaller of axial thicknesses of the two layers of the multi-contact diffractive optical element in close contact with each other, and a grating height "h" of a diffractive optical surface possessed by the multi-contact diffractive optical element satisfy $$0.05 < h/d < 2.0 \quad (6).$$

7. The spectacle lens according to claim 1, wherein
   a rising surface of each grating of the diffractive optical surface possessed by the multi-contact diffractive optical element is provided with
   an inclination along a ray going toward the pupil.

8. The spectacle lens according to claim 1, wherein
   the overall lens system exclusive of the multi-contact diffractive optical element has a positive optical power, and
   the multi-contact diffractive optical element has a positive optical power.

9. The spectacle lens according to claim 1, wherein
   the overall lens system exclusive of the multi-contact diffractive optical element has a negative optical power, and
   the multi-contact diffractive optical element has a negative optical power.

10. The spectacle lens according to claim 1, wherein
    the overall lens system is a meniscus lens convex toward an object side, and
    a formation target of the multi-contact diffractive optical element is a surface on a pupil side or a surface on the object side of the meniscus lens.

11. The spectacle lens according to claim 1, wherein
    the overall lens system is a cemented meniscus lens convex toward an object side, and
    a formation target of the multi-contact diffractive optical element is a cementing surface of the cemented meniscus lens.

12. A spectacle lens comprising:
    a multi-contact diffractive optical element formed on a concave surface of a meniscus lens with a negative optical power, wherein
    the multi-contact diffractive optical element has a negative optical power, and
    of two layers of the multi-contact diffractive optical element in close contact with each other, a layer on the concave surface side of the meniscus lens has a refractive index higher than that of the other layer.

13. The spectacle lens according to claim 12, wherein
    a rising surface of each grating of the diffractive optical surface possessed by the multi-contact diffractive optical element is provided with an inclination along a ray going toward a pupil, and
    a maximum value $\Delta_{mx}$ of a length of the rising surface in a direction perpendicular to an optical axis satisfies $$2\mu m < \Delta_{mx} < 30\mu m \quad (7).$$

* * * * *